United States Patent Office 2,726,256
Patented Dec. 6, 1955

2,726,256
ORGANO-PHOSPHORUS ESTERS

Rupert C. Morris, Berkeley, and John L. Van Winkle, San Lorenzo, Calif., assignors to Shell Development Company, Emeryville, Calif., a corporation of Delaware No Drawing. Application March 25, 1952,
Serial No. 278,506

3 Claims. (Cl. 260—461)

This invention relates to the provision of novel organo-phosphorus esters, and it is particularly directed to diphosphonates derived from a primary or a secondary organophosphonic acid and a glycol.

The compounds of the present invention are characterized by the possession of the internal structural grouping C—P—O—R—O—P—C, and can be described as having the general formula:

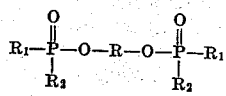

where R is the residue of a glycol, the $R_1$'s represent organic groups bonded to the adjacent phosphorus atoms by carbon-to-phosphorus bonds, and the $R_2$'s represent radicals selected from the group consisting of —$OR_3$ and —$R_3$, where the $R_3$'s are organic radicals.

More particularly, in the general formula above the glycol residue indicated by R can represent an alkylene group which is the residue of an unsubstituted aliphatic glycol, as ethylene glycol, propylene glycol, trimethylene glycol, tetramethylene glycol, pentamethylene glycol, hexamethylene glycol, 3-methyl-1,7-heptane-diol, or the like.

The $R_1$'s and $R_3$'s in the foregoing structural formulae can be purely hydrocarbon radicals such as alkyl, aryl, cycloalkyl, alkaryl and/or aralkyl, for example, or they can be hydrocarbon groups that are substituted to a minor extent by inert substituents such as chloro, bromo, alkoxy, nitro and the like which do not appreciably alter the essentially hydrocarbon character of the organo group. Thus, the $R_1$'s and $R_3$'s can be such groups as methyl, ethyl, propyl, butyl, octyl, phenyl, tolyl, benzyl, cinnamyl, cyclohexyl, allyl, 1-propenyl, vinyl, crotyl, p-nitrophenyl, beta-chloroethyl, or the like. The $R_1$'s can be the same as or different from the $R_3$'s, and, again, the one $R_1$ or $R_3$ can be the same or different from the other $R_1$ or $R_3$. When the $R_1$ and $R_2$ groups in the one acid function are the same as those in the other, then the compounds of the present invention are termed homo-diphosphonates. Representative compounds falling into this class are given below, with the structural formula of the first two compounds listed also being given so as to illustrate and make clear the meaning of the nomenclature system employed.

Ethylene glycol bis-(dimethanephosphate)

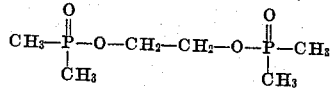

Hexylene glycol bis-(butyl ethanephosphonate)

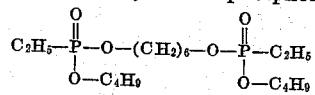

Hexylene glycol bis-[di(2-ethylhexane) phosphonate]
3-methyl-1,7-heptanediol bis[di-(2-ethylhexane)-phosphonate]
Propylene glycol bis-(tolyl-m-butanephosphonate)
Trimethylene glycol bis-(N-butyl toluenephosphonate)
Hexylene glycol bis-(tolyl toluenephosphonate)
Hexylene glycol bis-(benzyl benzenephosphonate)
Hexylene glycol bis-(benzyl toluenephosphonate)
Hexylene glycol bis-(cyclohexyl benzenephosphonate)
Ethylene glycol bis-(cyclohexyl cyclohexanephosphonate)
Trimethylene glycol bis-(cyclopentyl ethanephosphonate)

The foregoing compounds and others of the same general class can readily be prepared by reacting the corresponding mono- or diorgano-phosphonic acid halide with the desired glycol, preferably in the presence of a hydrogen halide acceptor. These reactants, together with the hydrogen halide acceptor can be added to one another at a temperature of from about −10° C. to about 30° C., with the mixture then being warmed on a steam bath for a period of from about 1 to 6 hours. Typical hydrogen halide acceptors which can be employed for this purpose are amines such as trimethylamine, pyridine or dimethylaniline. Alternatively, the hydrogen halide involved during the reaction can be removed as it is formed, as by passing a current of air or other inert gas through the reaction mixture as the reaction progresses.

Another class of compounds coming within the scope of this invention comprises the hetero-diphosphonates wherein dissimilar acid functions are attached through oxygen to the glycol residue. Representative compounds coming within this class are Ethylene glycol(ethyl butanephosphonate) (methyl benzene phosphonate)

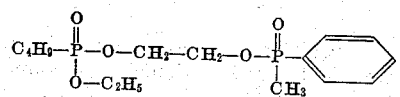

Ethylene glycol (dimethanephosphonate) (diethanephosphonate)

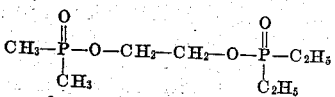

Trimethylene glycol (n-butyl p-toluenephosphonate) (phenyl methanephosphonate)
Hexylene glycol (cyclohexyl hexanephosphonate) (n-butyl n-butane phosphonate)

These and other hetero diphosphonates can be prepared in much the same fashion as is the case with the homo-diglycolates. In preparing the hetero compounds, however, the desired mono- or diorgano-phosphonic acid halide is reacted with a monohydric alcohol which preferably also contains a halogen substituent in addition to the hydroxy group. Once the monophosphonate has been formed, the halogen atom on the alcohol residue can then be hydrolyzed and the resulting alcohol ester then further esterified with the desired organophosphonic acid halide compound. Thus, hexylene glycol (dimethanephosphonate) (butyl methanephosphonate) can be prepared by reacting 6-bromohexanol and dimethane phosphonyl chloride in the presence of a hydrogen chloride acceptor compound. The 6-bromohexyl dimethanephosphonate is then converted by hydrolysis to 6-hydroxyhexyl dimethanephosphonate which, on being reacted with butyl methanephosphonyl chloride in the presence of a hydrogen chloride acceptor, yields the desired product compound.

In preparing homo- and hetero-diphosphonates by the methods described above, good results are obtained when the various reactants are employed in the theoretically required proportions. However, an excess of one or the other of the reactants can be employed if desired, though this method of operation is generally somewhat more costly since it involves added material-handling and separating expense. Following the reaction which is productive of the desired diphosphonate compound, the reaction mixture can be water-washed to remove hydrogen halide salts, following which the mixture may, if desired, be washed with dilute hydrochloric acid to remove any excess of amine or other base which may be present. Alternatively, any hydrogen halide salts present can be removed by filtration. The purification process can then be completed by distilling off any volatile constituents remaining, thus leaving the desired diphosphonate compound.

The esters of the present invention range in consistency from viscous liquids to hard and sometimes waxy solids. The esters which are normally liquid in character have a high viscosity index, are resistant to oxidation and have good fluidity at low temperatures. They therefore are well adapted for use as synthetic lubricants and as hydraulic fluids, among other applications. They can be used for these and other applications either with or without the employment of a suitable additive or diluent. All of the compounds of the present invention have the ability to impart extreme pressure qualities to lubricating oils of either natural or synthetic character. Thus, the esters of this invention can be diluted by admixture with a hydrocarbon or other lubricant and can improve the extreme pressure qualities of such lubricants even when employed therein in concentrations as low as 0.2% by weight. Such compositions may be further supplied with other types of additives, including anti-corrosion agents, detergents, antioxidants, thickeners and the like. In addition to their utility as and in lubricants, hydraulic fluids, and similar compositions, the ester compositions of this invention can be employed as textile assistants, as plasticizers, as thread lubricants, and as flame retardants in the treatment of paper, cloth and other normally inflammable materials.

The following example shows the formation of a compound which is illustrative of the ester compounds of the present invention.

Example

A mixture of 26 grams (0.25 mole) of pentamethylene glycol, 79 grams of pyridine and 1000 cc. of toluene was cooled to 25° C., and to the resulting mixture there was then slowly added, with stirring, 160 grams (0.52 mole) of bis(2-ethylhexane) phosphonyl chloride. When the addition of the chloride was complete, the reaction mixture was heated at 72° C. for a period of 4 hours, after which the mixture was filtered to remove the pyridine hydrochloride. After evaporating off the remaining solvent there remained 160 grams of crude pentamethylene glycol bis-[di-2-ethylhexane)phosphonate], which was then distilled through a molecular still and washed with dilute sodium hydroxide. The resulting refined ester product had the appearance of a viscous, yellow oil, with an acid number of 0.02. It had a boiling point of 153–160° C. at 0.006 mm., a density ($d$ 20/4) of 0.9424 and a refractive index ($n20/D$) of 1.4687. The ester, which was insoluble in water, contained 9.4% phosphorus (calculated, 9.56% P) and had a molecular weight of 648 (calculated mol. wt., 625).

The invention claimed is:

1. A diphosphonate having the general formula:

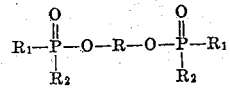

wherein R represents an alkylene group containing 2 to 8 carbon atoms, $R_1$ represents a member of the group consisting of aliphatic hydrocarbon groups containing 1 to 8 carbon atoms and carbocyclic monocyclic hydrocarbon groups containing 5 to 7 carbon atoms, bonded to the adjacent phosphorus atom by a phosphorus-to-carbon bond, and $R_2$ represents a member of the group consisting of the hydrocarbon groups represented by $R_1$, bonded to the adjacent phosphorus atom by a phosphorus-to-carbon bond, and said hydrocarbon groups bonded to the adjacent phosphorus atom by an oxy (—O—) linkage.

2. A diphosphonate having the general formula:

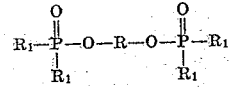

wherein R represents an alkylene group containing 2 to 8 carbon atoms, and each $R_1$ represents an alkyl group containing 1 to 8 carbon atoms.

3. The compound pentamethylene glycol bis-[di-(2-ethylhexane)phosphonate].

References Cited in the file of this patent

UNITED STATES PATENTS

| | | |
|---|---|---|
| 2,411,671 | Smith et al. | Nov. 26, 1946 |
| 2,586,655 | Hook et al. | Feb. 19, 1952 |
| 2,586,656 | Hook et al. | Feb. 19, 1952 |
| 2,653,161 | Ballard et al. | Sept. 22, 1953 |

OTHER REFERENCES

Oliver et al.: Ind and Eng. Chemistry, vol. 42, pages 488–491 (1950).